United States Patent [19]

Nagai

[11] Patent Number: 4,691,678

[45] Date of Patent: Sep. 8, 1987

[54] SYSTEM FOR CONTROLLING THE IGNITION TIMING OF AN INTERNAL COMBUSTION ENGINE

[75] Inventor: Masaaki Nagai, Fuchu, Japan

[73] Assignee: Fuji Jukogyo Kabushiki Kaisha, Tokyo, Japan

[21] Appl. No.: 813,107

[22] Filed: Dec. 24, 1985

[30] Foreign Application Priority Data

Dec. 28, 1984 [JP] Japan ................................ 59-280553

[51] Int. Cl.⁴ .......................... F02P 5/14; F02D 41/22
[52] U.S. Cl. ..................................... 123/425; 123/435
[58] Field of Search ............................... 123/425, 435

[56] References Cited

U.S. PATENT DOCUMENTS

| 4,190,027 | 2/1980 | Inui et al. ........................ 123/425 X |
| 4,274,379 | 6/1981 | Iwata et al. ......................... 123/425 |
| 4,489,692 | 12/1984 | Haraguchi et al. ................. 123/425 |
| 4,552,111 | 11/1985 | Tahara ................................ 123/425 |

Primary Examiner—Willis R. Wolfe, Jr.
Attorney, Agent, or Firm—Martin A. Farber

[57] ABSTRACT

A system for quickly converging the ignition timing to a desired timing. The number of inversions of correcting direction, such as from advancing to retarding, is counted up. The quantity of correction at a time is gradually reduced as the number increases.

2 Claims, 11 Drawing Figures

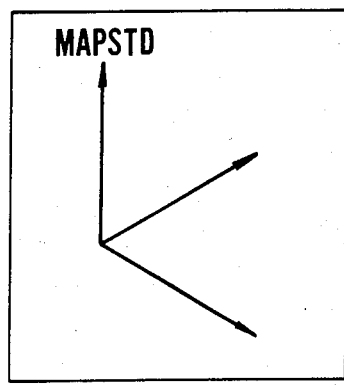
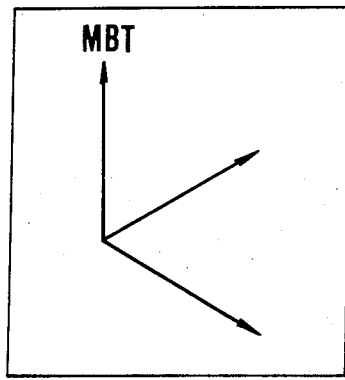
FIG. 3a    FIG. 3b
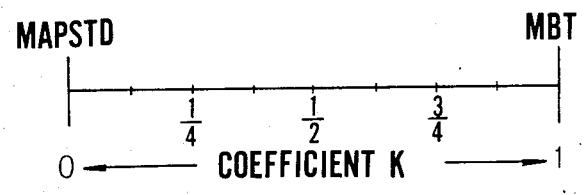
FIG. 4

SYSTEM FOR CONTROLLING THE IGNITION TIMING OF AN INTERNAL COMBUSTION ENGINE

BACKGROUND OF THE INVENTION

The present invention relates to a system for controlling the ignition timing of an internal combustion engine such as an automotive engine.

A learning control system for correcting the ignition timing has been proposed. The control system is adapted to advance the ignition timing so as to produce a maximum torque as long as the level of engine knocking does not exceed a tolerable level. The ignition timing stored in a RAM is corrected by a small correcting quantity (quantity of correction) and converges to a desired value little by little. The correcting quantity for the ignition timing at every updating operation is gradually reduced as the ignition timing approaches the desired value.

In order to reduce the correcting quantity, it is necessary to determining that the corrected ignition timing approaches the desired timing. If the decision is not properly made, it takes a long time for the ignition timing to converge to the desired timing.

SUMMARY OF THE INVENTION

The object of the present invention is to provide a control system whereby the ignition timing can quickly converge to a desired ignition timing.

In the system of the invention, the number of inversions of correcting direction, such as from advancing to retarding, is counted up. The quantity of correction at a time is gradually reduced as the number increases, so that the ignition timing quickly/converges to a desired timing.

According to the present invention, there is provided a system for controlling the ignition timing of an internal combustion engine having a microprocessor and an ignition timing control device comprising, sensing means for sensing operating conditions of the engine and for producing an engine operating condition signal, a knock sensor for sensing engine knock and for producing a knock signal.

The system further comprises first means responsive to the engine operating condition signal and knock signal for producing an ignition timing correcting signal representing an ignition timing correcting quantity at a time for deciding the ignition timing, second means for counting up the number of inversions of the correcting direction dependent on the ignition timing correction signal, and third means for reducing the ignition timing correcting quantity as the number increases.

The other objects and features of this invention will become understood from the following description with reference to the accompanying drawings.

BRIEF DESCRIPTION OF DRAWINGS

FIG. 3a and 3b show tables storing a plurality of ignition timings;

FIG. 4 shows a range of a coefficient K;

DETAILED DESCRIPTION OF THE PREFERRED EMBODIMENT

Figure 1:
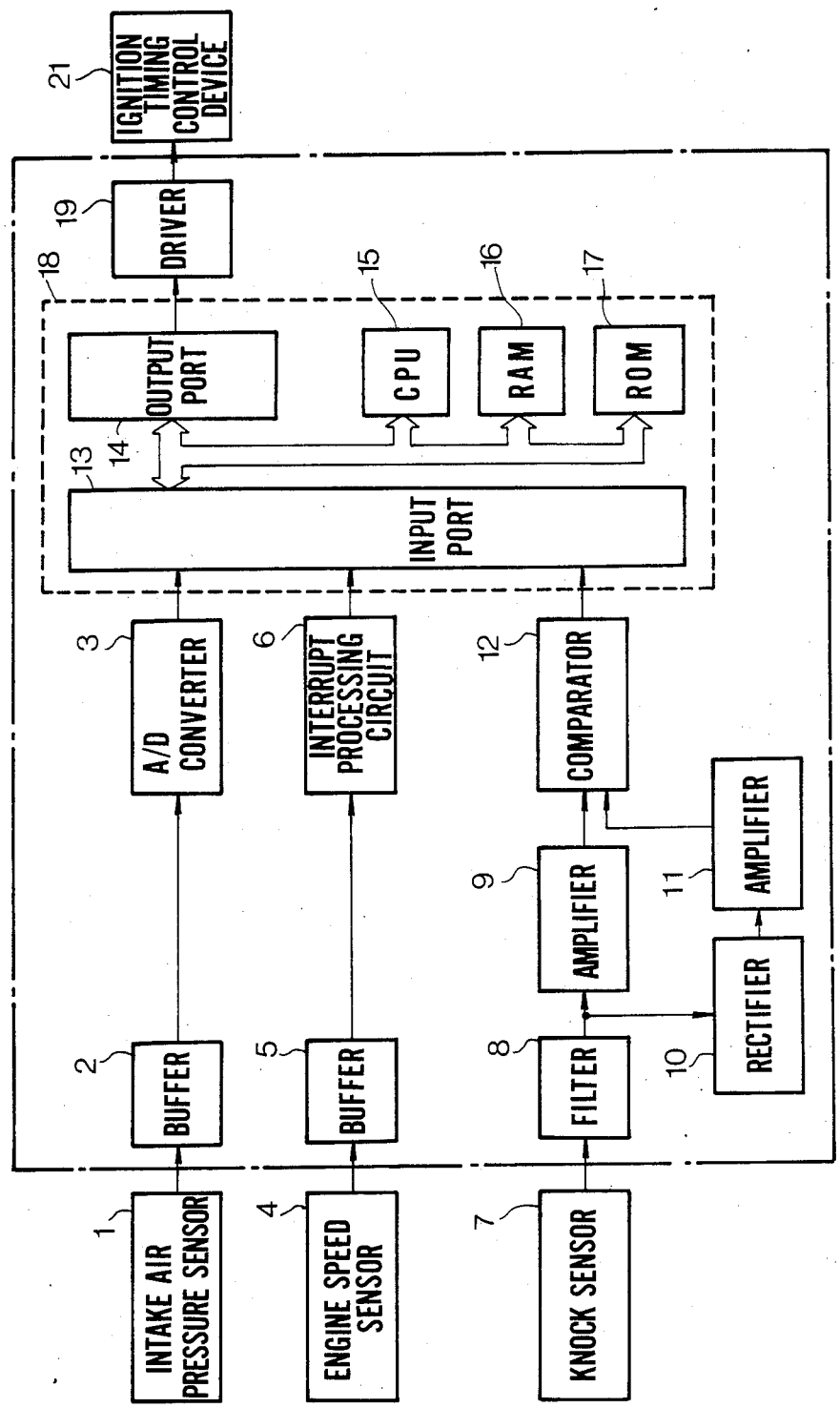
FIG. 1 is a block diagram showing a control system according to the present invention.

Referring to FIG. 1, an intake air pressure (or quantity) sensor 1, an engine speed sensor 4 such as a crankangle sensor, and a knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and amplifier 9, and, on the other hand, to the comparator 12 through a rectifier 10 and amplifier 11. The comparator 12 compares both inputs and produces an output signal when engine knocking having a higher level than a predetermined value occurs. Outputs of the A/D converter 3, circuit 6 and comparator 12 are applied to a microprocessor 18 through an input port 13.

The microprocessor 18 comprises a CPU 15, RAM 16, ROM 17 and output port 14. The output of the microprocessor 18 is applied to an ignition timing control device 21 through a driver 19 so as to control the ignition timing in accordance with the engine operating conditions sensed by the sensors 1, 4 and 7.

Figure 5:
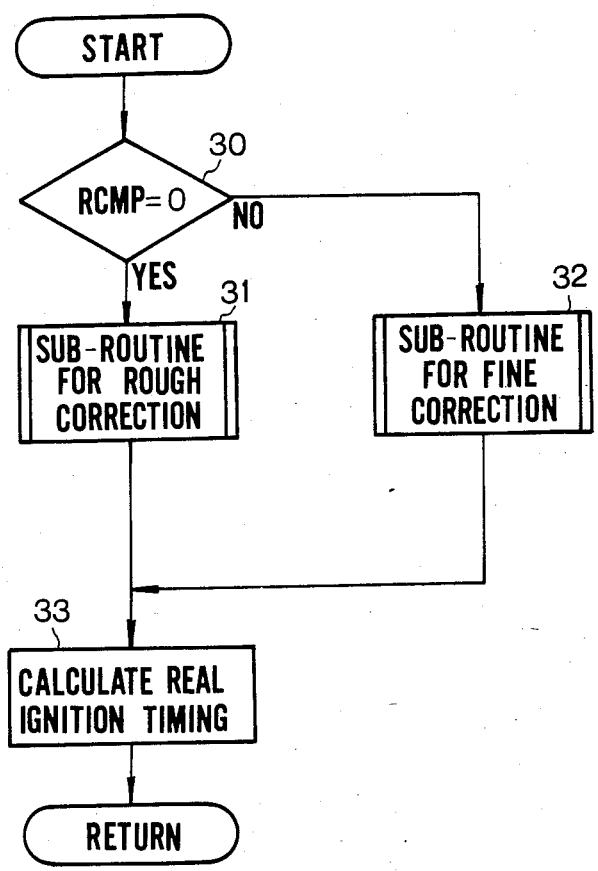
FIGS. 5, 6, 7a and 7b are flowcharts showing the operation of the system.

FIG. 5 summarizes the operation of the control system. The operation is divided into a rough correction and a fine correction. Step 30 determines whether a rough correction has been executed (whether a rough correction completion flag RCMP is set). In accordance with the decision, the rough correction or fine correction is executed in a rough correction subroutine 31 or a fine correction subroutine 32. At a step 33, a real ignition timing $SRK_{real}$ is calculated.

Figure 2:
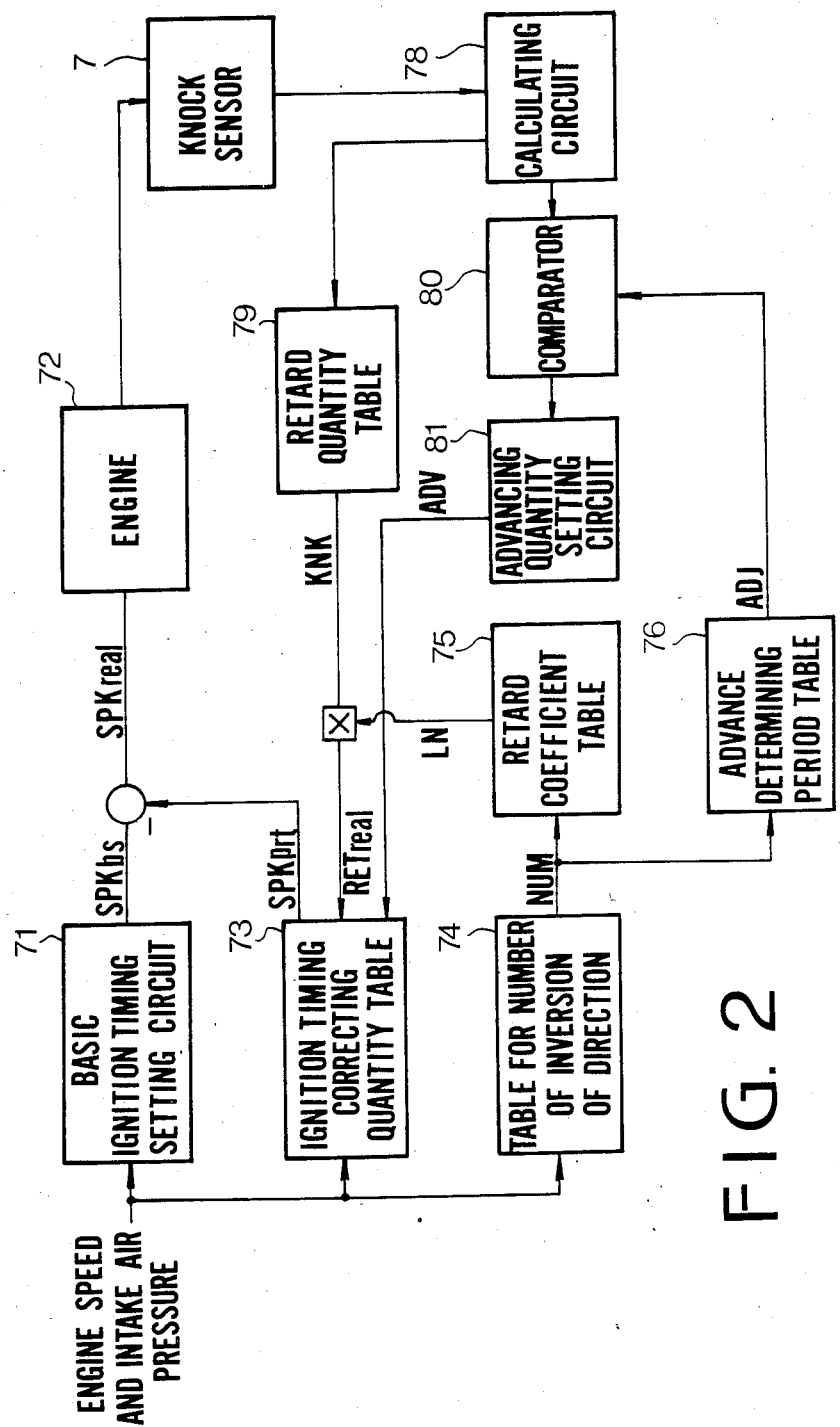
FIG. 2 is a block diagram showing a main part of the control system.
Figure 6:
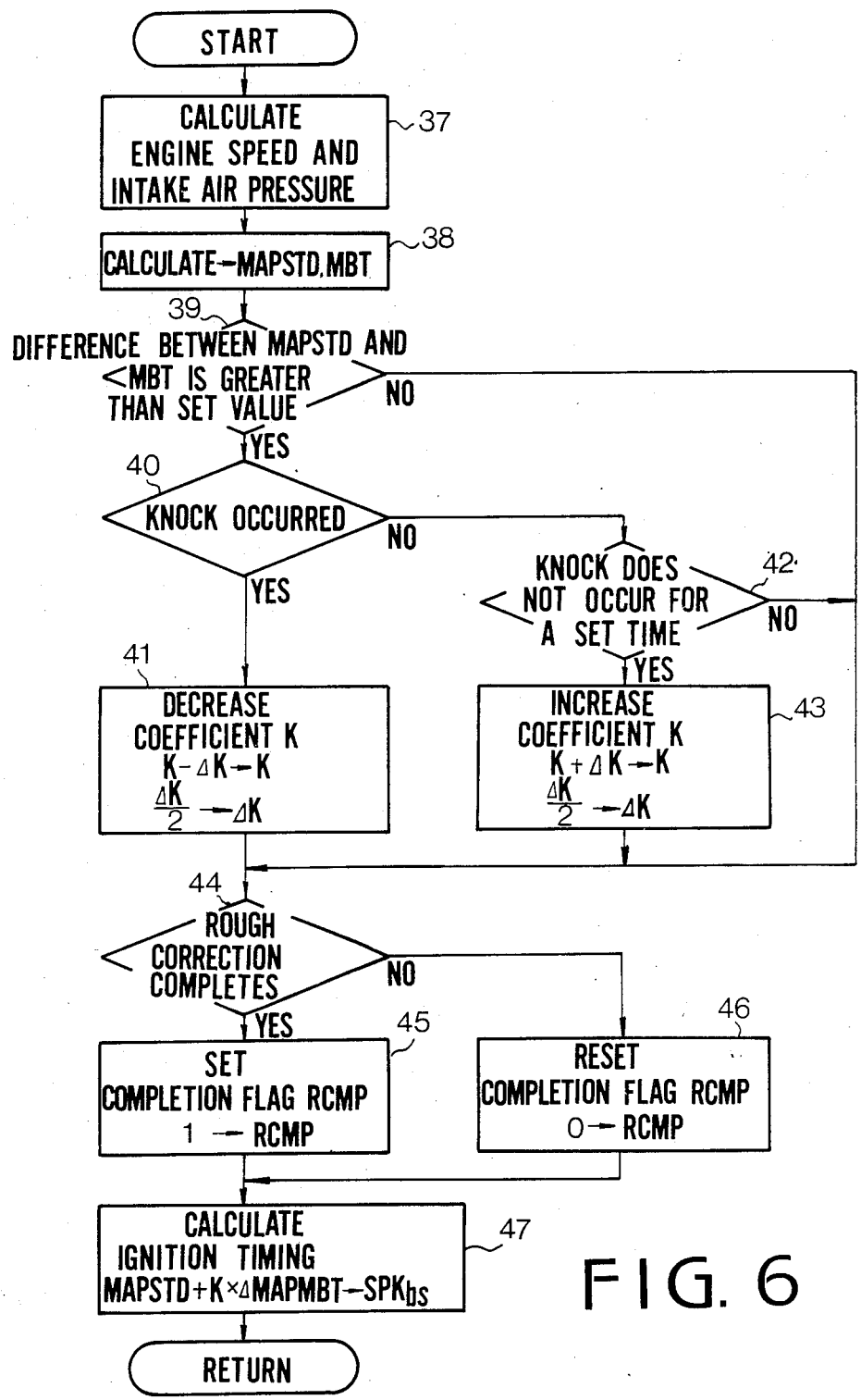

The rough correction is an operation for obtaining a basic ignition timing $SPK_{bs}$ which is calculated in a basic ignition timing setting circuit 71 shown in FIG. 2. FIG. 6 shows the operation of the rough correction. At a step 37, engine speed and intake air pressure are calculated based on the output signals of the sensors 1 and 4. Thereafter, at a step 38, a first maximum ignition timing MAPSTD and a second maximum ignition timing MBT are read from tables 38a and 38b (FIGS. 3a, 3b) in the ROM 17, in accordance with the engine speed and intake air pressure. The first maximum ignition timing is maximum timing for producing maximum torque with low-octane gasoline without the occurrence of knocking and the second maximum ignition timing is maximum timing for producing maximum torque with high-octane gasoline without the occurrence of knocking.

In the system, a coefficient K for correcting the ignition timing is provided. The value of the coefficient K is preliminarily set to a value between zero and 1 as shown in FIG. 4.

The coefficient K is stored in the RAM 16 and updated in accordance with engine operating conditions so that the ignition timing roughly converges to a desired ignition timing. The updating is performed under a predetermined condition and the condition is determined at a step 39. When the difference between the first and second maximum ignition timings read from the tables 38a and 38b is larger than a predetermined degree, for example 5°, the updating is performed. Namely, the program proceeds to a step 40, where it is determined whether a knocking has occurred during the program. When the occurrence of knocking is determined, the program proceeds to a step 41, and if not, proceeds to a step 42. At step 41, the coefficient K is decremented by a correcting quantity ΔK(ΔK=K/2), and the remainder K - ΔK is stored in the RAM 16 as a new coefficient for the next updating. Accordingly, the correcting quantity ΔK at the next updating is (K - αK)/2. Namely, the correcting quantity is a half of the coefficient K at updating. More particularly, if the initial coefficient is ½, the correcting quantity is 1/4, and if it is 0 or 1, the correcting quantity is ½ as seen from FIG. 4.

At the step 42, it is determined whether the engine has operated without knocking for a predetermined period. When knocking does not occur for the period, the coefficient K is incremented by the correcting quantity ΔK at a step 43.

After the updating of the coefficient K at step 41 or 43, it is determined whether the rough correction is completed at a step 44. As will be understood from the above description, the correcting quantity ΔK decreases as the number of the correction increases. In the system, when the correcting quantity reaches a predetermined small value, the rough correction is completed. Accordingly, if the quantity ΔK reaches the predetermined value, a rough correction completion flag RCMP is set at a step 45, or if not, the flag is reset at a step 46. On the other hand, the total correcting quantity $SPK_{prt}$ and the number of correction NUM of ignition timing are stored in an ignition timing correcting quantity table 73 and a table 74 (FIG. 2) for the number of correction. At a step 47, a basic ignition timing $SPK_{bs}$ is calculated by the following formula $$SPK_{bs} = MAPSTD + K \times \Delta MAPMBT \quad (1)$$

where $\Delta MAPMBT = MBT - MAPSTD$

The basic ignition timing is applied to an engine 72 (FIG. 2) to operate the engine at the ignition timing. The coefficient K is stored in the RAM 16. If the rough correction is not completed, the coefficient K is updated at the next program so that the ignition timing roughly converges to a desired ignition timing as described above. It will be understood that if the initial coefficient K is O, the basic ignition timing $SPK_{bs}$ calculated by the formula (1) is the maximum ignition timing MAPSTD at the first program. The basic ignition timing $SPK_{bs}$ obtained by the rough correction is further corrected by the fine correcting operation as described hereinafter.

Figure 7A:
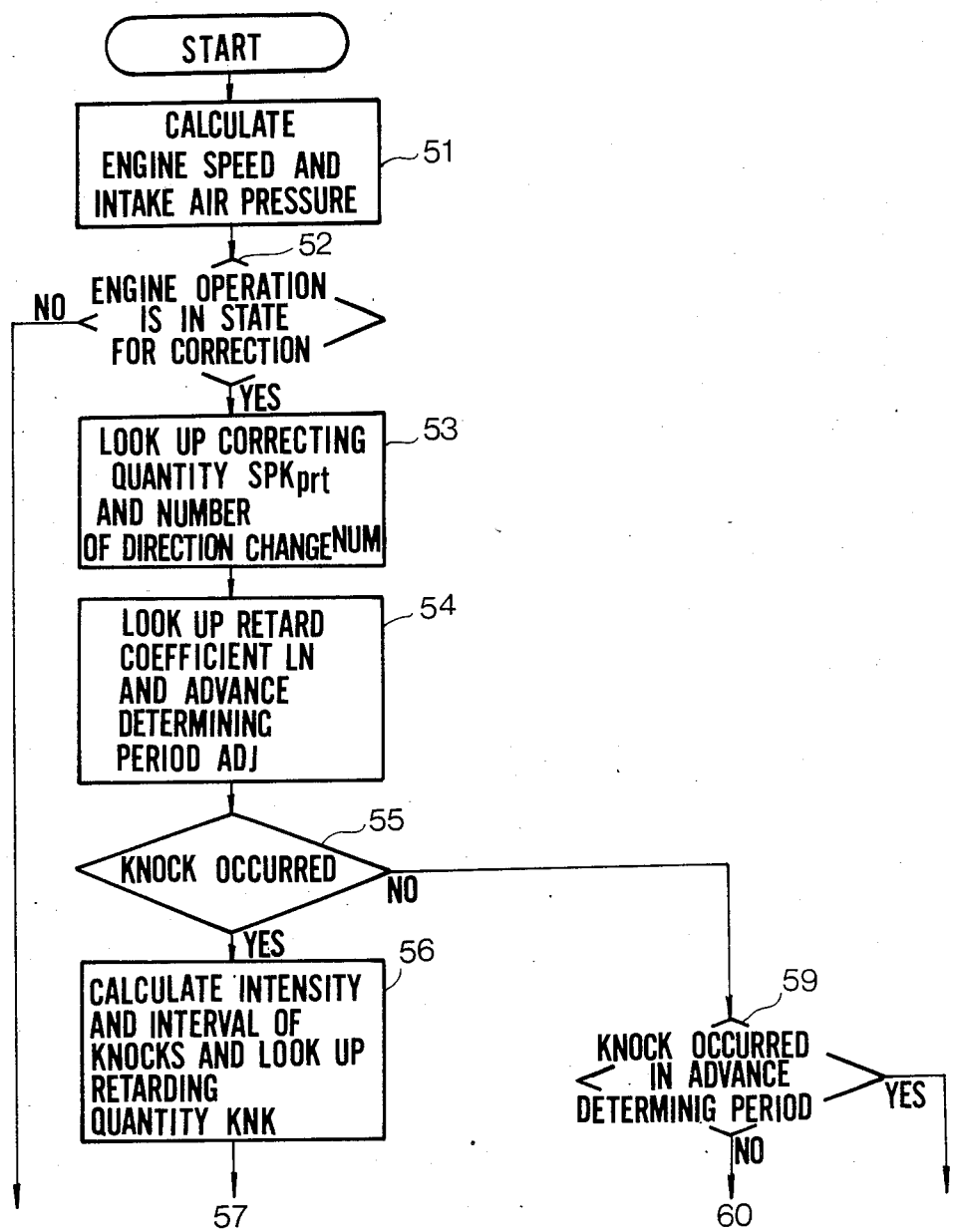
Figure 7B:
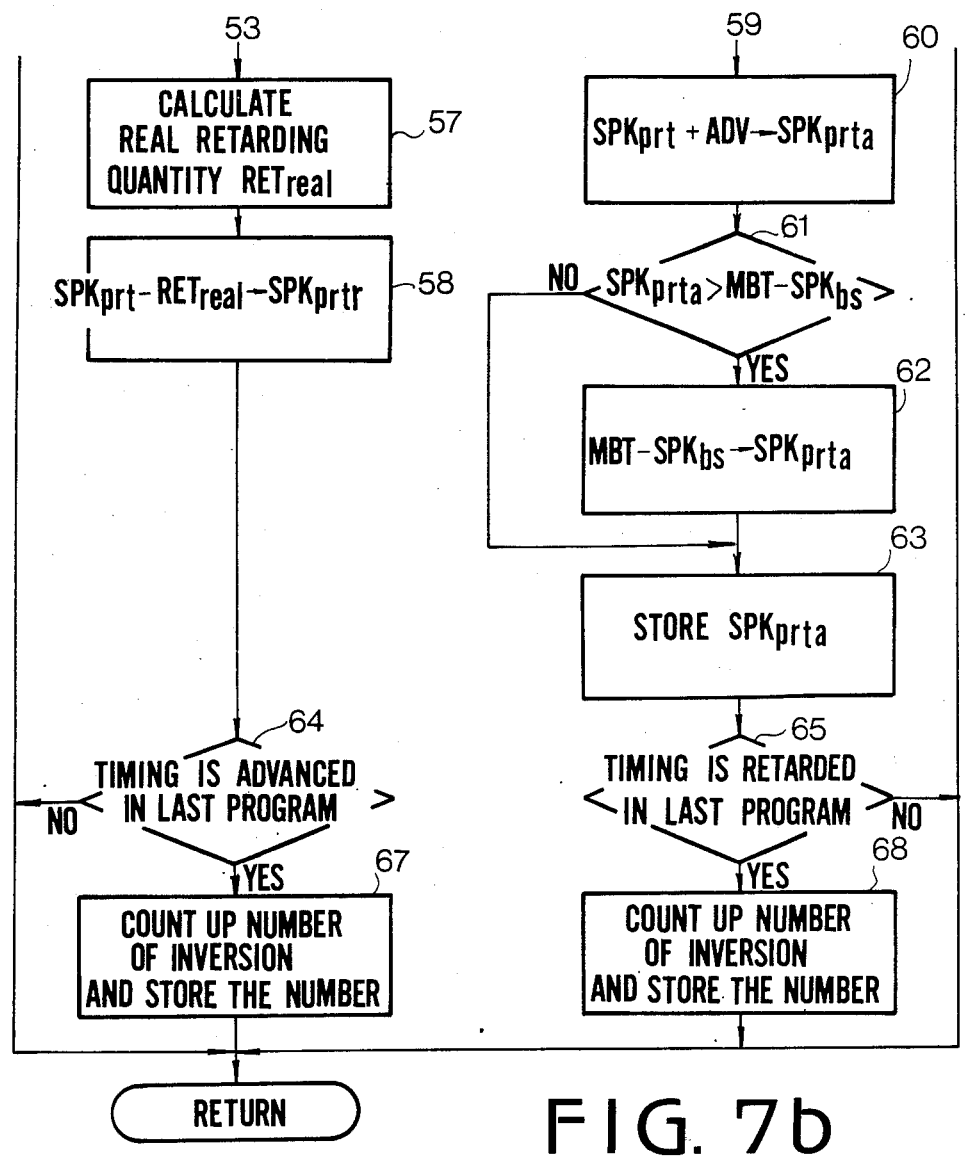
Figure 8A:
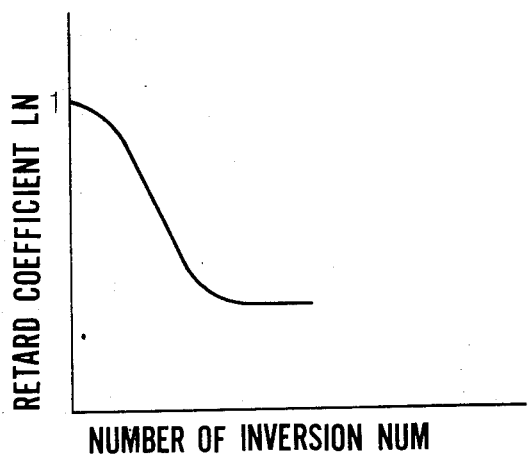
FIGS. 8a and 8b show a retard coefficient table and an advance determining period table, respectively.
Figure 8B:
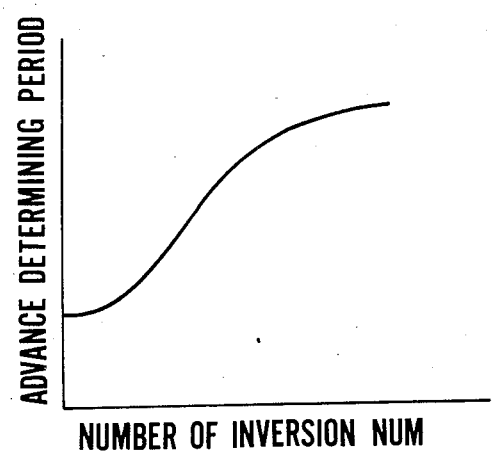

Referring to FIGS. 7a and 7b, at a step 52, it is determined whether the engine operation is in a range which is proper to correct the basic ignition timing $SPK_{bs}$. If it is in the range, the correcting quantity $SPK_{prt}$ and the number of the inversions of correcting direction NUM are read from tables 73 and 74 at a step 53. Then, at a step 54, a retard coefficient LN for retarding quantity RET is looked up from a retard coefficient table 75 (FIG. 2) of FIG. 8a in accordance with the number of the inversions of the correcting direction NUM, and an advance determining period ADJ is looked up from an advance determining period table 76 (FIG. 2) of FIG. 8b in accordance with the number of the inversions of the correcting direction NUM. Thereafter, the program proceeds to a step 55, where it is decided whether knocking has occurred during the program. When the occurrence of knocking is determined, the program proceeds to a step 56, and if not, it proceeds to a step 59. At step 56, the intensity of the knocking and the interval of the knocks are calculated at a calculating circuit 78 (FIG. 2), and then, retarding quantity KNK is looked up from a retarding quantity table 79 in accordance with the intensity and the interval of the knocks At a step 57, a real retarding quantity $RET_{real}$ is calculated by multiplying the retarding quantity KNK and retard coefficient LN together ($RET_{real} = KNK \times LN$). Thereafter, the program proceeds to a step 58, where the correcting quantity $SPK_{prt}$ stored in the table 73 is subtracted with the real retarding quantity $RET_{real}$ to obtain a new correcting quantity $SPK_{prtr}$ which is stored in the table 73.

On the other hand, at the step 59, it is decided whether knocking occurs in the advance determining period ADJ, which is performed at a comparator 80 in FIG. 2. When knocking does not occur in the period, the program proceeds to a step 60, where an advancing quantity ADV of a constant small value is added to the correcting quantity $SPK_{prt}$ to obtain a new correcting quantity $SPK_{prta}$ which is performed in an advancing quantity setting circuit 81 in FIG. 2 and stored in the table 73. Thereafter, at a step 61, it is determined whether the new correcting quantity $SPK_{prta}$ is larger than a limit value which is obtained by subtracting the basic ignition timing $SPK_{bs}$ from the maximum ignition timing MBT (MBT-$SPK_{bs}$). When the new correcting quantity $SPK_{prta}$ is smaller than the limit value, the new correcting quantity is stored in the table 73 at a step 63. If it is larger than the limit value, the value of MBT-$SPK_{bs}$ is used as a new correcting quantity (at a step 63) and stored in the table 73. The real ignition timing $SPK_{real}$ is calculated by the following formula.

$$SPK_{real} = SPK_{bs} - SPK_{prta(r)}$$
$$= MAPSTD + K(MBT - MAPSTD) - SPK_{prta(r)}$$

After steps 58 and 63, it is determined whether the correcting direction in the program is the inverse of the correcting direction in the last program at steps 64 and 65. Namely, at step 64, it is determined whether the ignition timing is advanced in the last program, and, at step 65, it is determined whether the timing is retarded. If the inversion of direction is made, the program proceeds to a step 67 or 68, where a signal is applied to a counter to count the number of inversions of correcting direction and the number is stored in a table. When the corrected ignition timing approaches the desired timing, the direction of correction tends to reverse. In other words the fact of the number becoming large means that the corrected timing approaches the desired timing. Accordingly, the retard coefficient LN shown in FIG. 8a decreases and the advance determining period ADJ of FIG. 8b increases with an increase of the number of the inversions NUM. Thus, in accordance with the present invention, the progress of correction can be exactly detected and it is possible to cause the ignition timing to quickly converge to a desired timing.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling the ignition timing of an internal combustion engine having a microprocessor and an ignition timing control device comprising:

sensing means for sensing operating conditions of the engine and for producing an engine operating condition signal;

a knock sensor for sensing engine knocking and for producing a knock signal;

first means responsive to the engine operating condition signal and knock signal for producing an ignition timing correcting signal representing an ignition timing correcting quantity at a time for deciding the ignition timing;

second means for counting up the number of inversions of correcting direction dependent on the ignition timing correction signal;

third means for reducing the ignition timing correcting quantity as the number increases.

2. The system according to claim 1 wherein the ignition timing correcting quantity is decreased by reducing a coefficient.

* * * * *